Figure 1:
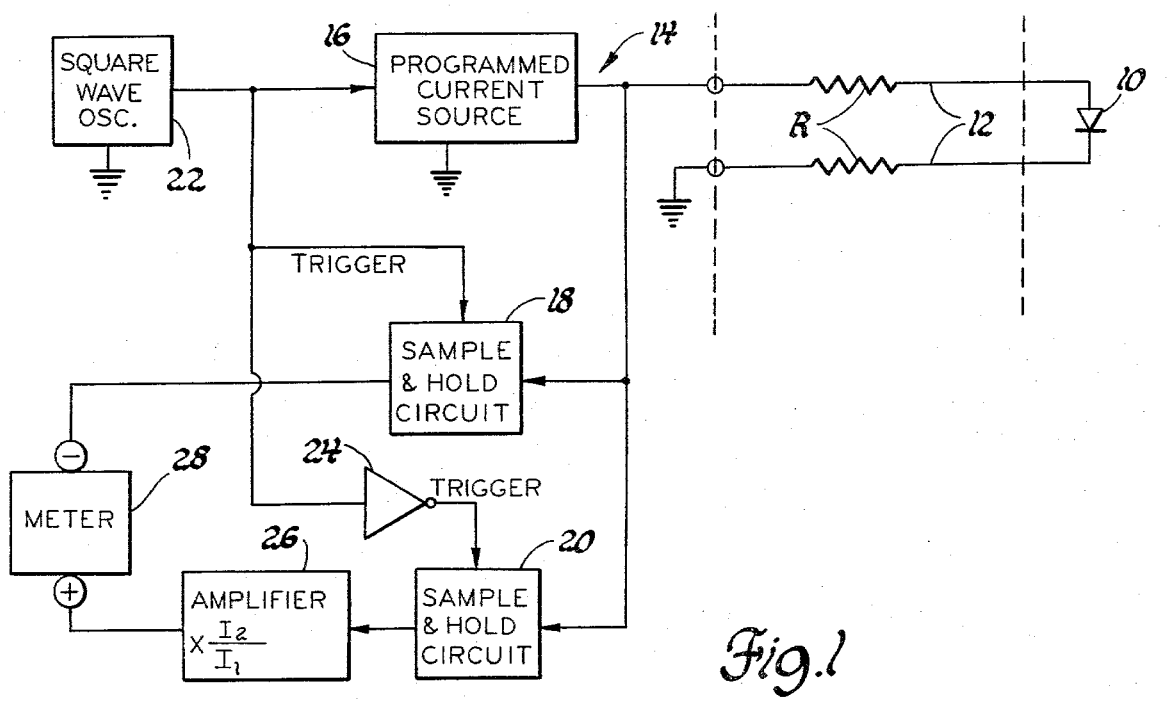

United States Patent [19]

Templin

[11] 4,228,684
[45] Oct. 21, 1980

[54] REMOTE TEMPERATURE MEASURING SYSTEM WITH SEMICONDUCTOR JUNCTION SENSOR

[75] Inventor: Jackson R. Templin, Anderson, Ind.

[73] Assignee: General Motors Corporation, Detroit, Mich.

[21] Appl. No.: 45,269

[22] Filed: Jun. 4, 1979

[51] Int. Cl.³ ............................................. G01K 7/10
[52] U.S. Cl. ................................................ 73/362 SC
[58] Field of Search .......... 73/359 A, 362 SC, 359 R, 73/362 R, 342, 361; 364/557

[56] References Cited

U.S. PATENT DOCUMENTS

| 3,430,077 | 2/1969 | Bargen | 307/310 |
| 3,812,717 | 5/1974 | Miller et al. | 73/362 SC |

*Primary Examiner*—Jerry W. Myracle
*Attorney, Agent, or Firm*—Warren D. Hill

[57] ABSTRACT

A circuit is provided for measuring the effect of temperature on the voltage drop across the semiconductor junction sensor which is located remotely from the measuring circuit and connected thereto by a pair of conductors having substantial lead resistance. The circuit provides a programmed current source which alternately provides to the sensor first and second currents of different magnitudes having a fixed ratio to produce corresponding voltages across the conductors wherein each voltage includes a lead component arising from the lead resistance and the respective current. A sample and hold circuit measures each of the voltages and an amplifier multiplies one of the voltages by the current ratio and the resultant voltages are compared to obtain an output free of any lead component and which varies with the temperature of the sensor.

2 Claims, 2 Drawing Figures

REMOTE TEMPERATURE MEASURING SYSTEM WITH SEMICONDUCTOR JUNCTION SENSOR

This invention relates to a temperature measuring circuit having a remotely located semiconductor junction sensor as the temperature sensor and more particularly to such a circuit having no sensitivity to the resistance of the leads running to the remotely located sensor.

It is desired in many applications such as the measurement of temperature of a gas turbine engine to use a sensor located remotely from the measuring circuit. A very useful sensor is a semiconductor junction such as a diode at the temperature measuring point wherein the voltage drop across the sensor is dependent upon its temperature and a current applied through the junction. Where the voltage measuring circuit is remote from the sensor, the electrical leads between the circuit and the sensor introduce resistance which, in turn, affect the apparent sensor voltage measured at the measuring circuit. It has been proposed to overcome that problem by adding additional components at the sensing junction, by using additional connecting leads, or making the leads of heavier stock and thus lower resistance than is necessary to pass the measuring current.

It is, therefore, a general object of the invention to provide a measuring circuit which permits the use of a pair of minimum size lead wires and a single semiconductor junction at the temperature measuring point.

The invention is carried out by providing a current source for supplying first and second currents to the sensor, the currents having a fixed ratio producing first and second voltages across the lead conductors so that the voltages include a lead component arising from the lead resistance of the conductors, a detector for sensing the two voltages and a circuit for multiplying a first voltage by the current ratio to derive a third voltage having a lead component equal to that of the second voltage, and a measuring device for measuring the difference between the second and third voltages to obtain an output free of any lead component but which varies with the temperature of the sensor.

Figure 2:
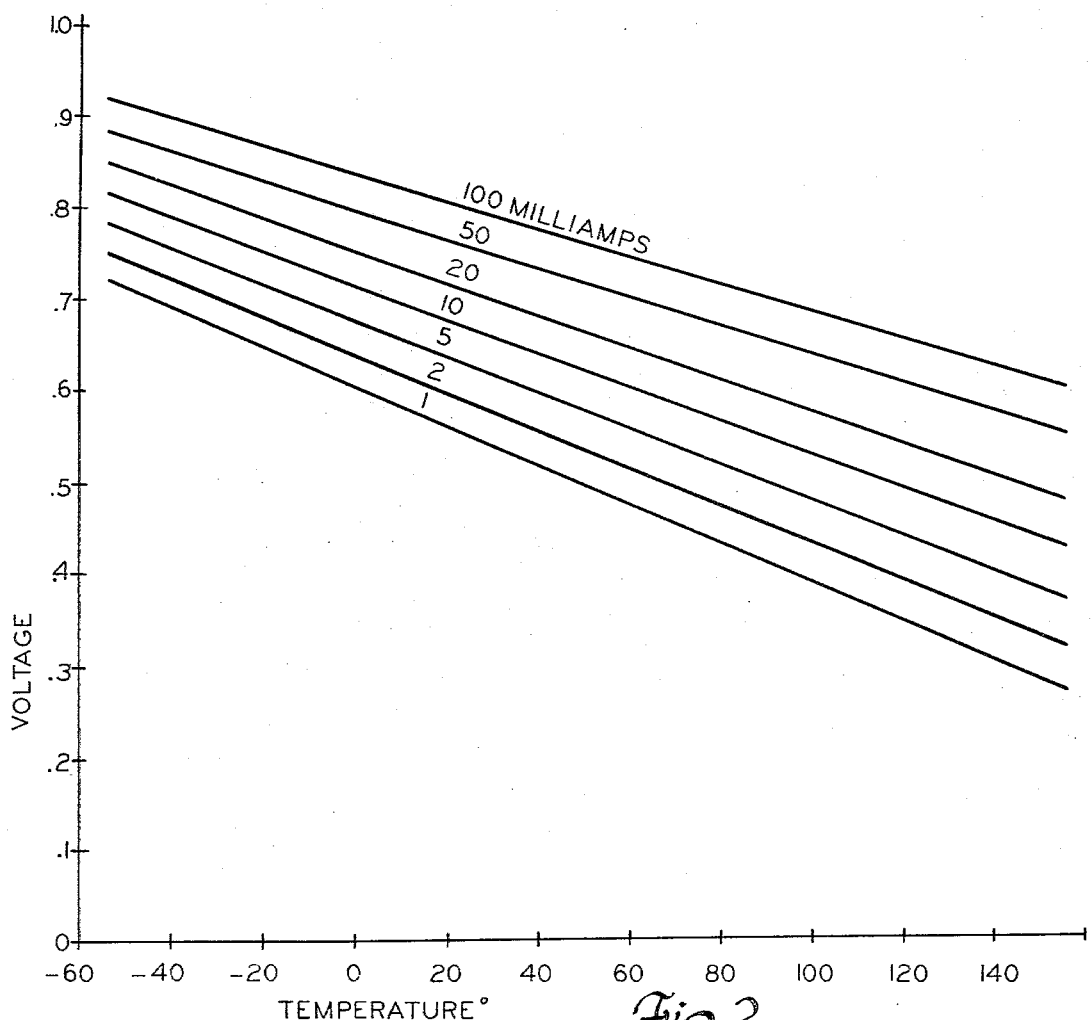

The above and other advantages will be made more apparent from the following specification taken in conjunction with the accompanying drawings wherein:

FIG. 1 is a block diagram of a temperature measuring system according to the invention; and FIG. 2 is a diagram of voltage versus temperature at different currents for an exemplary rectifier.

FIG. 1 shows a sensor 10 comprising a semiconductor junction in the form of a diode which is, for example, a general purpose rectifier of the type 1N3611. That rectifier is connected to leads 12 of substantial length and having an aggregate lead resistance R. One of the leads 12 is grounded at the measuring circuit 14 and the other lead is connected to a programmed current source 16 and a pair of sample and hold circuits 18 and 20 which comprise a portion of the measuring circuit 14. A square wave oscillator 22 feeds a control signal to the programmed current source 16 to cause alternation of the current source between two values $I_1$ and $I_2$ having a fixed ratio $(I_2/I_1)$. This ratio may be either larger or smaller than unity. Thus, those two currents, each constant in value, are imposed on the remote sensor 10 through the leads 12. At a given current, the voltage drop across the semiconductor junction varies fairly linearly with temperature. This is illustrated in the diode characteristics shown in FIG. 2 wherein the voltage across the diode is plotted against temperature for various current levels. The plot of FIG. 2 is derived from data published by Siemens Corporation of the characterisitcs of a 1N3611 rectifier. The uniform slope of each line illustrates the linear dependence of the voltage at a given current upon temperature. The voltages $V_1$ and $V_2$ detected at the sample and hold circuits 20 and 18, however, include diode voltage drop and the voltage induced in the lead resistance R by the currents $I_1$ and $I_2$.

In operation the oscillator 22 causes the current source to produce the currents $I_1$ and $I_2$, and synchronously the sample and hold circuits are alternately energized by a trigger signal from the oscillator 22, the trigger signal for circuit 20 being inverted by the inverter 24. The output of the sample and hold circuit 20 is multiplied by an amplifier having a gain equal to the current ratio $(I_2/I_1)$. A meter 28 connected across the output of the sample and hold circuit 18 and the output of the amplifier 26 senses the difference between those two voltages. That difference is independent of the effects of the lead resistance R and is a linear representation of the voltage drops across the semiconductor junction which, in turn, is a substantially linear representation of the semiconductor temperature.

Stating the circuit function mathematically, $V_1 = I_1R + f(I_1, T)$ and $V_2 = I_2R + f(I_2, T)$ where T is the diode temperature. By multiplying the value of $V_1$ by the current ratio $(I_2/I_1)$, we obtain the value representing the output of the amplifier 26, $V_3 = I_2R + (I_2/I_1)f(I_1, T)$. Then by subtracting $V_3$ from $V_2$ the term $I_2R$ is cancelled and the resulting voltage across the meter 28 is $V_4 = (I_2/I_1)f(I_1, T) - f(I_2, T)$. $V_4$ thus is a function of only the current levels chosen and the diode temperature. For most diodes, $V_4$ is more linear with temperature than the diodes' normal characteristic since at high current levels, the effect of internal bulk resistance of the diode becomes a significant part of its terminal voltage and the circuit according to this invention eliminates the effects of internal bulk resistance just as though it were series resistance R.

It will thus be recognized that the circuit according to this invention provides an improved arrangement for measuring the temperature of a semiconductor junction sensor independently of any lead resistance and therefore obviates the requirement for very large conductors or additional components at the temperature measurement point.

The embodiments of the invention in which an exclusive property or privilege is claimed are defined as follows:

1. A temperature measuring circuit for measuring the effect of temperature on the voltage drop across a semiconductor junction sensor located remotely from the measuring circuit wherein the measuring circuit is connected to the sensor by a pair of conductors having lead resistance, comprising;

a current source connected to the conductors for providing to the sensor first and second currents alternately having a fixed ratio thereby producing first and second voltages respectively across the conductors wherein said voltages each include a lead component arising from the lead resistance and the respective current, means for detecting the first and second voltages, means for multiplying the first voltage by the said fixed ratio to derive a third voltage having a lead component equal to that of the second voltage, and means for measuring the difference between the second and third voltages to obtain an output which is free of any lead component and which varies substantially linearly with the temperature of the sensor.

2. A temperature measuring circuit for measuring the effect of temperature on the voltage drop across a semiconductor junction sensor located remotely from the measuring circuit wherein the measuring circuit is connected to the sensor by a pair of conductors having lead resistance, comprising;

a programmed current source connected to the conductors for alternately providing to the sensor first and second currents $I_1$ and $I_2$, respectively, having a fixed ratio ($I_2/I_1$) thereby producing first and second voltages respectively across the conductors wherein said voltages each include a lead component arising from the lead resistance and the respective current, means for sampling and holding the first voltage, which voltage includes a lead component $I_1R$ proportional to the first current, means for sampling and holding the second voltage, which second voltage includes a lead component $I_2R$, amplifier means having a gain of ($I_2/I_1$) for multiplying the first voltage by the said fixed ratio ($I_2/I_1$) to derive a third voltage having a lead component $I_2R$ equal to that of the second voltage, and means for measuring the difference between the second and third voltages to obtain an output which is free of any lead component and which varies substantially linearly with the temperature of the sensor.

* * * * *